United States Patent [19]

Rheindorf et al.

[11] 4,262,322
[45] Apr. 14, 1981

[54] IMPREGNATED ELECTRIC CAPACITOR

[75] Inventors: Hans-Heinz Rheindorf, Herbrechtingen; Friedewald Schreiber, Steinheim, both of Fed. Rep. of Germany

[73] Assignee: Siemens Aktiengesellschaft, Berlin & Munich, Fed. Rep. of Germany

[21] Appl. No.: 45,619

[22] Filed: Jun. 5, 1979

[30] Foreign Application Priority Data

Jun. 20, 1978 [DE] Fed. Rep. of Germany ....... 2827023

[51] Int. Cl.³ ............................................. H01G 1/017
[52] U.S. Cl. ................................... 361/273; 29/25.42; 361/314; 361/315; 427/79
[58] Field of Search ............... 361/315, 314, 317, 304, 361/273; 29/25.42; 427/79

[56] References Cited

U.S. PATENT DOCUMENTS

| 2,104,797 | 1/1938 | Di Giacomo . | |
| 3,346,789 | 10/1967 | Robinson | 361/304 |
| 3,619,743 | 11/1971 | Ferrante | 361/317 X |
| 3,648,339 | 3/1972 | Preissinger | 361/314 X |
| 4,170,665 | 10/1979 | Behn | 361/315 X |

FOREIGN PATENT DOCUMENTS

| 893381 | 9/1953 | Fed. Rep. of Germany . |
| 2117345 | 4/1971 | Fed. Rep. of Germany . |
| 1191299 | 5/1970 | United Kingdom . |
| 1242180 | 8/1971 | United Kingdom . |

Primary Examiner—Elliot A. Goldberg
Attorney, Agent, or Firm—Hill, Van Santen, Steadman, Chiara & Simpson

[57] ABSTRACT

An impregnated electric wound capacitor has a dielectric consisting of synthetic foils which are wound with paper tapes. The synthetic foils are impregnated with mineral oil and swell such that a residual impregnation gap remains between dielectric and the paper tapes. The existance of such a residual impregnation gap assures that re-impregnation will occur after the capacitor is subjected to temperature changes during operation or after a gas pocket develops due to a partial blow-out.

6 Claims, 1 Drawing Figure

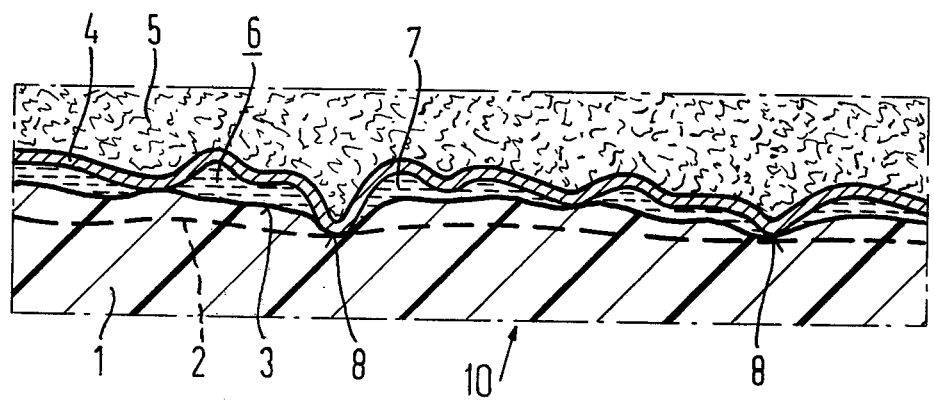

IMPREGNATED ELECTRIC CAPACITOR

BACKGROUND OF THE INVENTION

1. Field of the Invention

The present invention relates to impregnated electric wound capacitors.

2. Description of the Prior Art

Impregnated electric wound capacitors are known in the art, such as German Auslegeschrift 18 15 478, which have a dielectric consisting of swollen polypropylene foils impregnated with mineral oil and whose electrodes consist of paper tapes metalized on both sides and arranged in the field-free space. The polypropylene foils of the capacitor generally exhibit a minimum swelling of 0.3 $\mu$m. The swelling of the foils is accordingly dimensioned in such a manner that practically no residual impregnation gap is present in the winding after the swelling is completed.

The absence of a residual impregnation gap means that re-impregnation of the winding is no longer assured after the winding is subjected to stresses of various types. Such stresses may be the result the temperature changes during operation, or a gas pocket which may arise due to a partial blow-out. These stresses produce hollow spaces in the winding at which partial discharges can occur when no impregnation agent can penetrate into the hollow spaces to re-impregnate the polypropylene foils. Moreover, a particular problem arises in connection with increased temperature, because the pressure in the winding can increase to such an extent that the foils or the paper tapes may rip, thereby destroying the capacitor.

SUMMARY OF THE INVENTION

A wound capacitor whose dielectric consists of polypropylene foils has electrodes consisting of paper tapes covered on both sides with a thin metal coating which is self-healing, with the paper tapes arranged in the field-free space. The thickness of the paper tapes is preferably greater than or equal to the thickness of the polyproplylene foils.

The paper tapes are wound in a damp state, after which the tapes are dried, whereby the paper tapes shrink so that the air gap between the tapes and the foils which was already present upon winding is enlarged. The air gap is dimensioned in such a manner that a residual impregnation gap is retained after impregnation of the polyproplylene foils with mineral oil or any other suitable impregnation agent.

The presence of such a residual impregnation gap ensures that the capacitor dielectric is re-impregnated after temperature changes or partial blow-outs.

It is accordingly an object of the present invention to provide a capacitor having a residual impregnation gap which ensures re-impregnation of the capacitor dielectric after the dielectric has been subjected to stresses as a result of temperature changes or partial blow-outs.

It is another object of the present invention to provide a method for the manufacturer of a capacitor of the type described.

BRIEF DESCRIPTION OF THE DRAWING

The drawing is a sectional view of a capacitor constructed in accordance with principles of the present invention having a residual impregnation gap between the electrodes and the dielectric.

DESCRIPTION OF THE PREFERRED EMBODIMENTS

A sectional view of a capacitor constructed in accordance with the principles of the present invention is shown generally at 10 in the drawing. The section 10 is a portion of a capacitor formed by winding a polypropylene foil layer 1 together with a paper tape 5. It will be understood that any number of polypropylene foil layers and paper tapes may be wound together to form the capacitor, however only one of each layer is shown in the drawing.

The paper tape 5 has a self-healing metal coating 4 thereon, forming the capacitor electrode.

The original surface of the polyproplylene foil layer 1 is shown by the dashed layer 2 as it exists prior to impregnation with an impregnation agent 7. Upon introduction of the impregnation agent 7 the polyproplylene foil layer swells and now exhibits a surface designated as 3.

The impregnation is controlled such that a residual impregnation gap 6 exists between the surface 3 of the polyproplylene foil layer and the metal coating 4 on the paper tape 5.

The metal coating 4 and the surface 3 meet at various points in the capacitor designated as 8, however such engagement is punctiform in nature so that the impregnation agent 7 can spread freely throughout the capacitor.

Paper tapes are commercially available having a number of different thicknesses of the metal coating 4 thereon. With polyproplylene foils which are less than or equal to 8 $\mu$m thick, paper tapes of a *glazing* degree A are preferably wound; with polypropylene foils having a thickness of 8 $\mu$m through 10 $\mu$m, paper tapes having a *glazing* degree B are preferable; and with polyproplylene foils having a thickness greater than or equal to 10 $\mu$m, paper tapes having a *glazing* degree C are preferably wound.

The thickness of the paper tapes is preferably greater than or equal to the thickness of the polypropylene foils. Preferred ranges can be derived from the following table, although adherence to the table is not necessary to the inventive concept herein.

| POLYPROPLYLENE FOIL $\mu$m | PAPER TAPE $\mu$m |
| --- | --- |
| 6 | 8 through 10 |
| 8 | 9 |
| 10 | 10 |
| 12 | 12 |
| 15 | 15 |

The paper tapes 5 and the polyproplylene layer 1 are preferably wound in a damp state whereby, for example, the paper exhibit a water content of greater than or equal to 5% by weight.

The wound paper tape 5 and polypropylene layer 1 are then dried, during which time the paper tape 5 shrinks so that the air gap which is already present upon winding is enlarged. The perimeters of the shrinking are controlled so that the air gap which results is dimensioned in such a manner that a residual impregnation gap 6 is retained after impregnation with a suitable impregnation agent.

An impregnation gap in the range of 0.1 $\mu$m is suitable to provide the advantages of re-impregnation after stress. Such a gap can be obtained utilizing a mineral oil consisting of approximately 10% by weight of a hydrogen-bonding aromatic compound, 25 to 45 percent by weight of a naphthenic compound, and 45 to 65 to percent of a paraffinic compound. The swelling or expansion of the polypropylene layer 1 is a result of the presence of the aromatic compound, while the naphthenic and and paraffinic compounds in the mineral oil contribute only to the viscosity and storage properties of the oil.

The swelling of the polypropylene layer 1 is preferably such that, given thicknesses of the polypropylene layer 1 which are smaller than or equal to 8 $\mu$m, the swelling is less than 8%, and, with foils having a thickness greater than 8 $\mu$m, the swelling is less than 5%.

All reference to "thickness" is to a mean thickness which is defined by an average line taking into account the unevenness of the paper and polyproplylene foil surfaces.

A suitable residual impregnation gap 6 can also be obtained by utilizing a correspondingly lower winding tension during the winding of the capacitor, and also by utilizing paper tapes and/or synthetic layers having surfaces which exhibit a greater amount of roughness or unevenness. The above methods can also be employed in combination.

It will be understood that any suitable synthetic foil may be utilized in place of the polypropylene layer 1, which is described herein for exemplarly purposes only.

Although modifications and changes may be suggested by those skilled in the art it is the intention of the inventors to embody within the patent warranted hereon all changes and modifications as reasonably and properly come within the scope of their contribution to the art.

We claim as our invention:

1. An impregnated wound electric capacitor having a dielectric comprised of swellable synthetic foils and electrodes comprised of paper tapes having self-healing metal coatings on both sides thereof, said capacitor having a plurality of residual impregnation gaps between said dielectric and said electrodes which remain after impregnation of the capacitor and swelling of the synthetic foil has ceased, said residual impregnation gaps having a mean thickness sufficient for permitting re-impregnation of said gaps with an impregnating agent after said foils are subjected to stress.

2. The capacitor of claim 1 wherein said residual impregnation gaps have a mean thickness of 0.1 $\mu$m.

3. The capacitor of claim 1 wherein the thickness of the paper tapes is greater than or equal to the thickness of the synthetic foils.

4. A process for the manufacture of an electric wound capacitor comprising the steps of:
   winding overlying paper tapes and synthetic foils into a cylindrical body;
   adjusting the winding tension used to wind to said synthetic foils and paper tapes to leave a gap between said foils and said tapes of a selected thickness; and
   impregnating said wound body to controllably swell said synthetic foils to diminish said gap leaving a residual impregnation gap containing an impregnation agent, said residual impregnation gaps having a mean thickness sufficient for permitting re-impregnation of said gaps with an impregnating agent after said foils are subjected to stress.

5. A process for the manufacture of an electric wound capacitor comprising the steps of:
   winding overlying damp paper tapes and synthetic foils to form a wound cylindrical body;
   drying said wound cylindrical body to produce gaps of a controlled thickness between said paper tapes and said synthetic foils; and
   impregnating said wound body with an impregnating agent to swell said synthetic foils to partially fill said gap between said foils and said tapes, leaving a residual impregnation gap therebetween, said residual impregnation gaps having a mean thickness sufficient for permitting re-impregnation of said gaps with an impregnating agent after said foils are subjected to stress.

6. A process for the manufacture of a wound electric capacitor comprising the steps of:
   selecting a synthetic foil dielectric having a thickness;
   selecting a paper tape electrode having a self-healing metal coating thereon from the group of: paper tapes treated with a glazing degree A, paper tapes treated with a glazing degree B, and paper tapes treated with a glazing degree C, depending on the thickness of said selected synthetic foil;
   covering said selected paper tape with said selected synthetic foil;
   winding said paper tape and said synthetic foil into a cylindrical wound body leaving a controlled gap therebetween depending upon the respective roughness of the surfaces of the paper tape and synthetic foil; and
   impregnating said wound body with an impregnating agent to swell said synthetic foil to partially fill said gap, leaving a residual impregnation gap between said synthetic foil and said paper tape, said residual impregnation gaps having a mean thickness sufficient for permitting re-impregnation of said gaps with an impregnating agent after said foils are subjected to stress.

* * * * *